Sept. 22, 1925.

R. M. HORSEY

ELECTRIC HEATER

Filed May 12, 1924

1,554,675

INVENTOR
RICHARD M. HORSEY
By Fetherstonhaugh & Co
ATTORNEYS

Patented Sept. 22, 1925.

1,554,675

UNITED STATES PATENT OFFICE.

RICHARD M. HORSEY, OF MONTREAL, QUEBEC, CANADA.

ELECTRIC HEATER.

Application filed May 12, 1924. Serial No. 712,821.

*To all whom it may concern:*

Be it known that I, RICHARD M. HORSEY, a subject of the King of Great Britain, and resident of the city of Montreal, in the Province of Quebec and Dominion of Canada, have invented certain new and useful Improvements in Electric Heaters, of which the following is a full, clear, and exact description.

This invention relates to new and useful improvements in heating devices, and the object of the invention is to provide a simple heating device having a large heating surface, which will greatly increase the circulation of heated air in the room in which it is placed.

In my invention, I provide a container for the heating element having a series of involute blades forming passages for the intake of air into the device. Mounted on the container is a pipe for inducing circulation of the heated air and through which the heated air passes into the surrounding atmosphere. A deflecting cone may be fitted to the end of the pipe for distributing the air over a large area.

In the drawings;—

Figure 3:
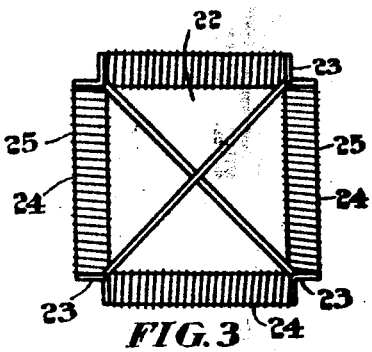
Fig. 3 is a plan view of the heating element.
Figure 2:
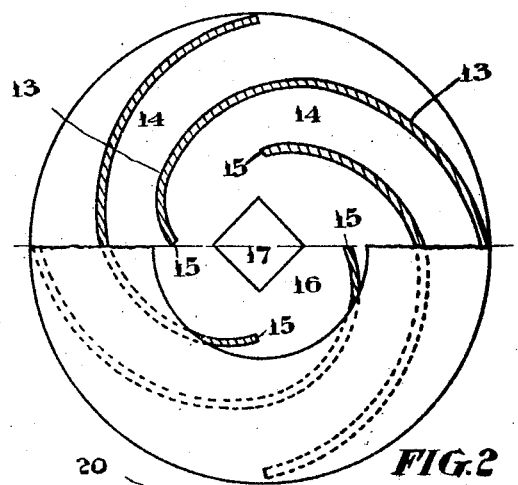
Fig. 2 is a plan view of the device with the upper half showing a sectional plan taken on the line A—B, Figure 1.

Referring more particularly to the drawings, 11 designates a top plate and 12 a bottom plate, between which are mounted curved plates 13 forming circuitous passages 14 from the outside to the inside of the device. The inner ends 15 of the plates 13 are spaced from the centre of the plates 11 and 12 and form a chamber 16 for the heating element 17. Projecting upwardly from the plate 11 is the pipe 18, the lower end 19 of which communicates with the chamber 16 and forms an outlet for the air heated by the element 17. A deflecting cone 20 may be fitted to the upper end 21 of the pipe, so that heated air passing through the pipe may be distributed over a large area. The cone may be supported by the brackets 20ª.

Figure 4:
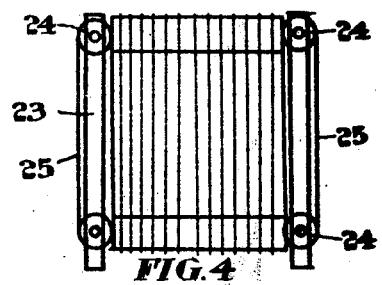
Fig. 4 is a side elevation of the heating element shown in Figure 3.

In Figures 3 and 4, I have shown one form of electrically operated heating element which may be used. Mounted on the base 22 are the supports 23, adapted to support the porcelain insulators 24, around which vertical coils 25 of high resistance wire may be wound in the usual manner.

Figure 5:
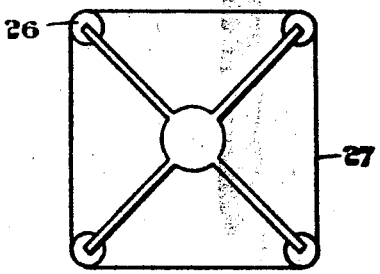
Fig. 5 is a plan view of a modification of the heating element shown in Figure 4.
Figure 6:
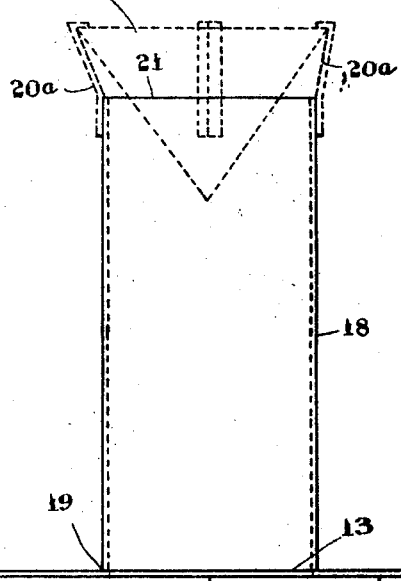
Fig. 6 is a side elevation of the heating element shown in Figure 5.
Figure 6:
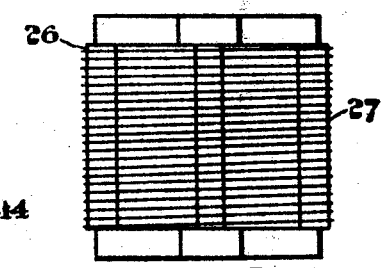
Figure 1:
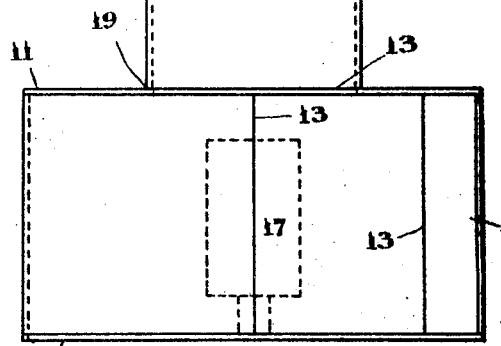
Fig. 1 is an elevation of the heating device.

In Figures 5 and 6, I have shown a modified type of heating element in which porcelains 26 are mounted in any suitable manner in the chamber. Horizontal coils 27 of high resistance wire are coiled around the porcelains and current may be supplied to the wires from any source (not shown).

Many modifications may be made in the construction of the device without departing from the spirit of the invention.

In operation, air is drawn into the device through the passages 14, is heated by the heating element, and passes through the pipe to the surrounding atmosphere. The curved vanes greatly increase the efficiency of the device by heating the air as it passes through the passages 14 on its way to the heating element in the chamber 16. The vanes may be covered with heat absorbing or heat reflecting material on one or both sides, and this factor may be determined by experiment so that the best results may be obtained.

Having thus described my invention, what I claim is;—

1. A heating device of the character described comprising a central chamber surrounded by a plurality of circuitous air inlet passages communicating therewith and an air discharge pipe extending upwardly from the top of said chamber and a heating element mounted in said chamber below said pipe.

2. A heating device of the character described comprising a central chamber surrounded by a plurality of circuitous air inlet passages communicating therewith, an air discharge pipe extending upwardly from the top of said chamber, a heating element mounted in said chamber below said pipe and deflecting means mounted at the upper end of the pipe and cooperating therewith to provide an annular discharge passage bounded by an upwardly and outwardly inclined inner wall.

3. A heating device comprising a bottom plate, a top plate, curved blades mounted between the bottom and top plates forming circuitous air passages from the outside to a central chamber formed between the top and bottom plates and the inner ends of the blades, a pipe mounted on the top plate and communicating with the central chamber, a heat deflecting cone secured to the upper end of the pipe, and a heating element mounted in the central chamber.

4. A device according to claim 3, having spirally wound coils of high resistance wire forming said heating element, and porcelain insulators forming the means of support for the coils.

5. A heating device comprising a bottom plate, a top plate, curved blades secured to and between the top and bottom plates, said blades extending from the outer edges of the plates to within a short distance of the centre of the plates and forming a central chamber, a pipe extending upwardly from the top plate and communicating with the central chamber, heat deflecting means mounted at the upper end of said pipe, and an electrically operated heating element mounted in the central chamber.

In witness whereof, I have hereunto set my hand.

RICHARD M. HORSEY.